US008952626B2

(12) United States Patent
Huang et al.

(10) Patent No.: US 8,952,626 B2
(45) Date of Patent: Feb. 10, 2015

(54) LIGHTING CONTROL SYSTEMS AND METHODS

(75) Inventors: Yao-Te Huang, Puxin Township, Changhua County (TW); Yung-Chuan Chen, Tainan (TW); Hung-Chun Li, Zhongli (TW); Yeu-Torng Yau, Tainan (TW); Ming-Shan Jeng, Hsinchu (TW); Ching-Ran Lee, Jinning Township, Kinmen County (TW)

(73) Assignee: Industrial Technology Research Institute, Hsinchu (TW)

( * ) Notice: Subject to any disclaimer, the term of this patent is extended or adjusted under 35 U.S.C. 154(b) by 705 days.

(21) Appl. No.: 13/212,669

(22) Filed: Aug. 18, 2011

(65) Prior Publication Data

US 2013/0043797 A1 Feb. 21, 2013

(51) Int. Cl.
*G05F 1/00* (2006.01)
*H05B 39/04* (2006.01)
(Continued)

(52) U.S. Cl.
CPC .......... *H05B 37/029* (2013.01); *H05B 37/0272* (2013.01)
USPC .......................................... 315/291; 315/158

(58) Field of Classification Search
CPC ............... H05B 37/0272; H05B 37/02; H05B 37/0245; H05B 37/0218; H05B 33/0842; H05B 37/0227; H05B 33/0845; H05B 33/0863; H05B 37/0281; H05B 33/0854; H05B 37/029; H05B 33/0857; H05B 37/03; H05B 37/034; H05B 33/0803; H05B 33/0839; H05B 37/00; H05B 33/08; H05B 33/0872; H05B 37/0209; H05B 33/0818; H05B 33/086; H05B 35/00; H05B 37/0254; H05B 33/0809; H05B 33/0815; H05B 33/0821; H05B 33/0869
See application file for complete search history.

(56) References Cited

U.S. PATENT DOCUMENTS 6,271,752 B1 8/2001 Vaios
6,340,864 B1 1/2002 Wacyk
(Continued)

FOREIGN PATENT DOCUMENTS

CN 1560753 A 1/2005
CN 2697989 Y 5/2005
(Continued)

OTHER PUBLICATIONS

Qadeer et al., "Application Remote Control Using Bluetooth," 2008 IEEE, 5 pages.
(Continued)

*Primary Examiner* — Douglas W Owens
*Assistant Examiner* — Dedei K Hammond
(74) *Attorney, Agent, or Firm* — Finnegan, Henderson, Farabow, Garrett & Dunner LLP

(57) ABSTRACT

Systems and methods for lighting control are disclosed. The system may include at least one lighting device providing illumination and a handheld unit coupled with the lighting device to control at least one of a controllable lighting state, a controllable lighting intensity, and a controllable lighting effect of the lighting device. The handheld unit may include an image-capturing device and a processor coupled with the image-capturing device. The processor may be configured to control the image-capturing device to capture an image of a space affected by the lighting device; analyze an luminance level of the space; receive a lighting parameter; and provide a command to the lighting device for controlling at least one of the controllable lighting state, the controllable lighting intensity, and the controllable lighting effect of the lighting device based on at least one of the image, the luminance level, and the lighting parameter.

31 Claims, 6 Drawing Sheets

(51) Int. Cl.
*H05B 37/02* (2006.01)
*H05B 41/36* (2006.01)

(56) References Cited

U.S. PATENT DOCUMENTS

| | | |
|---|---|---|
| 6,583,573 B2 | 6/2003 | Bierman |
| 6,990,394 B2 | 1/2006 | Pasternak |
| 7,004,606 B2 | 2/2006 | Schofield |
| 7,097,318 B2 | 8/2006 | Yoshihara |
| 7,268,799 B2 | 9/2007 | Patino et al. |
| 7,346,374 B2 | 3/2008 | Witkowski et al. |
| 7,550,935 B2 | 6/2009 | Lys et al. |
| 2005/0253538 A1 | 11/2005 | Shah et al. |
| 2008/0057929 A1 | 3/2008 | Min |
| 2012/0206051 A1* | 8/2012 | Nieuwlands ............... 315/153 |
| 2012/0306381 A1* | 12/2012 | Adler ........................ 315/152 |

FOREIGN PATENT DOCUMENTS

| | | |
|---|---|---|
| CN | 1750726 | 3/2006 |
| CN | 1896807 A | 1/2007 |
| CN | 101213880 | 7/2008 |
| CN | 101325683 A | 12/2008 |
| CN | 101358692 A | 2/2009 |
| CN | 101400201 A | 4/2009 |
| CN | 101463963 A | 6/2009 |
| CN | 101471993 A | 7/2009 |
| CN | 101632873 | 1/2010 |
| CN | 201444648 | 4/2010 |
| CN | 101742755 A | 6/2010 |
| CN | 101771824 A | 7/2010 |
| CN | 201608761 | 10/2010 |
| CN | 101888729 | 11/2010 |
| CN | 201821398 | 5/2011 |
| CN | 102143637 | 8/2011 |
| JP | 2010-157360 | 7/2010 |
| KR | 10-2008-0073994 | 8/2008 |
| KR | 10-2011-0076297 | 7/2011 |
| TW | 201004476 A1 | 1/2010 |
| TW | 201108859 A1 | 3/2011 |
| TW | M409671 U1 | 8/2011 |
| WO | WO 2010/123641 | 10/2010 |
| WO | WO 2011/055259 | 5/2011 |

OTHER PUBLICATIONS

Aldrich et al., "Energy Efficient Control of Polychromatic Solid-State Lighting Using a Sensor Network," Tenth International Conference on Solid State Lighting, Proc. of SPIE vol. 7784 778408-1, 15 pages, 2010.

Aldrich, Matthew, "Dynamic Solid State Lighting," Massachusetts Institute of Technology, Jun. 2010, 148 pages.

Zhao, Nan, "Smart Solid-State Lighting Control," Helmholtz-Institute Für Biomedizinische Technik Der Rwth Aachen, Lehrstuhl Für Medizinische Informationstechnik, Aug. 26, 2010, 96 pages.

Feng et al., "Design of a Wireless Sensor Network Based Automatic Light Controller in Theater Arts," Proceedings of the 14th Annual IEEE International Conference and Workshops on the Engineering of Computer-Based Systems, 2007 IEEE, 7 pages.

Office Action issued by Chinese Patent Office in Chinese Application No. 201210011980.6, dated Apr. 8, 2014, 5 pages.

Office Action issued by Taiwan Patent Office in Taiwan Application No. 100140849, dated Mar. 17, 2014, 17 pages.

* cited by examiner

LIGHTING CONTROL SYSTEMS AND METHODS

TECHNICAL FIELD

The present disclosure relates to lighting control systems and methods. In particular, the present disclosure relates to systems and methods for allowing the control of lighting devices by devices such as remote handheld units.

BACKGROUND

Indoor illumination designs are usually carried out by lighting designers. As an illustrative example, a designer can determine the types of lighting fixtures as well as the locations, angles, and other characteristics of those fixtures to provide the desired lighting effects and comfortable, well-lit environment. However, the design efforts, process, or considerations may make the approach expensive, burdensome, and/or inflexible.

In traditional lighting control, adjusting light intensity may require manually-controlled dimmers. However, many kinds of lighting fixtures require some time, such as about 30 to 60 minutes, before reaching their steady states, and light intensity and other lighting characteristics at initial states may differ from what they are at when reaching their steady states. As a result, the illumination level and other characteristics may change after lighting fixtures reach their steady states.

It may be desirable to have a lighting control system or method that may be inexpensive, flexible, or easy to use or design.

SUMMARY

Some disclosed embodiments include systems, apparatuses, methods, and computer-readable mediums for lighting control.

Some aspect of the disclosure may involve a lighting control system. The system may include at least one lighting device providing illumination, the lighting device having at least one of a controllable lighting state, a controllable lighting intensity, and a controllable lighting effect. The system may also include a handheld unit coupled with the at least one lighting device to control at least one of the controllable lighting state, the controllable lighting intensity, and the controllable lighting effect of the at least one lighting device. The handheld unit may comprise an image-capturing device for capture an image of a space affected by the at least one lighting device. The handheld unit may also include a processor coupled with the image-capturing device. The processor may be configured to control the image-capturing device to capture the image of the space; analyze an luminance level of the space; receive at least one lighting parameter; and provide a command to the at least one lighting device for controlling at least one of the controllable lighting state, the controllable lighting intensity, and the controllable lighting effect of the at least one lighting device based on at least one of the image, the luminance level, and the at least one lighting parameter.

Another aspect of the disclosure may involve handheld apparatus for lighting control. The handheld apparatus may be coupled with at least one lighting device to control at least one of controllable lighting state, controllable lighting intensity, and controllable lighting effect of the at least one lighting device. The handheld unit may include an image-capturing device for capture an image of a space affected by the at least one lighting device. The handheld unit may also include a processor coupled with the image-capturing device. The processor may be configured to control the image-capturing device to capture the image of the space; analyze an luminance level of the space; receive at least one lighting parameter; and provide a command to the at least one lighting device for controlling at least one of the controllable lighting state, the controllable lighting intensity, and the controllable lighting effect of the at least one lighting device based on at least one of the image, the luminance level, and the at least one lighting parameter.

Another aspect of the disclosure may involve method for lighting control. The method may comprise controlling, by a processor of a handheld unit, an image-capturing device to capture an image of a space affected by at least one lighting device; analyzing an luminance level of the space; receiving at least one lighting parameter; and providing a command to the at least one lighting device for controlling at least one of controllable lighting state, controllable lighting intensity, and controllable lighting effect of the at least one lighting device based on at least one of the image, the luminance level, and the at least one lighting parameter.

Another aspect of the disclosure may involve a non-transitory computer-readable medium encoded with software code instructions. When executed by a computer, the software code instructions may implement a method for lighting control. The method may comprise controlling an image-capturing device to capture an image of a space affected by at least one lighting device; analyzing an luminance level of the space; receiving at least one lighting parameter; and providing a command to the at least one lighting device for controlling at least one of controllable lighting state, controllable lighting intensity, and controllable lighting effect of the at least one lighting device based on at least one of the image, the luminance level, and the at least one lighting parameter.

The preceding summary and the following detailed description are exemplary only and do not limit of the scope of the claims.

BRIEF DESCRIPTION OF THE DRAWINGS

The accompanying drawings, which are incorporated in and constitute a part of this specification, in connection with the description, illustrate various embodiments and exemplary aspects of the disclosed embodiments. In the drawings.

DESCRIPTION OF EXEMPLARY EMBODIMENTS

Reference will now be made in detail to exemplary embodiments, examples of which are illustrated in the accompanying drawings. When appropriate, the same reference numbers are used throughout the drawings to refer to the same or like parts.

Embodiments of the present disclosure may involve apparatuses, systems, methods, and computer-readable mediums for lighting control. The term "lighting control" may refer to any technique of controlling light emitting devices ("light sources") to achieve desirable lighting conditions. The control may include dimming, adjusting, or switching on and off of light sources and/or controlling their illumination or lighting characteristics, such as illuminance, glare, luminance, spectrum, color or color temperature, intensity, time duration of on/off period, light color, correlated color temperature, output lumens, etc. Because of the widespread applications of computers, processors, and/or communication technology, it is possible to design a lighting environment and control a lighting system by computer or portable computing or processing devices. Devices having the ability of lighting design, which may have other non-lighting related functions, such as being a phone, a personal digital assistant (PDA), a tablet PC, an electronic book reader, etc., will provide user a less-expensive alternative.

Figure 1:
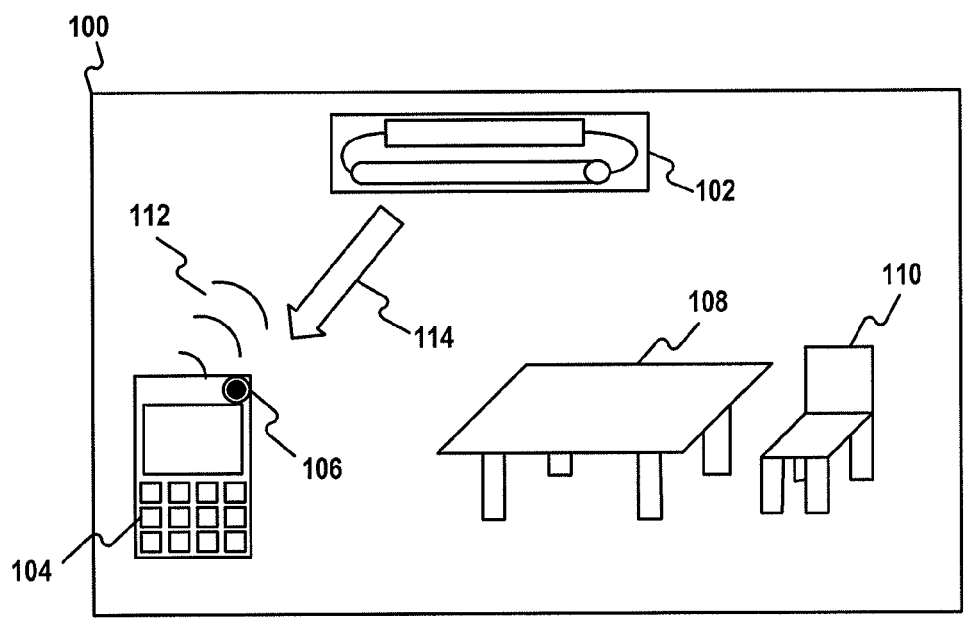
FIG. 1 is a schematic diagram illustrating an exemplary lighting control system consistent with some disclosed embodiments.

FIG. 1 illustrates an exemplary lighting control system. The system can be set up in a space 100, such as a room or any enclosed or non-enclosed space in which lighting control is desired. The system is not limited to one lighting space, instead, the system can be implemented in a multi-space (e.g., multi-room, multi-section, etc.) scenario. The system may include one or more lighting device 102, which may provide light illumination to lighting space 100. The system may also include a handheld unit 104. Handheld unit 104 may be equipped with a camera 106, and configured to communicate with lighting device 102 wirelessly. For example, handheld unit 104 may send control signal 112 to lighting device 102 via a wireless interface to control the lighting behavior of lighting device 102. Lighting device 102 may also send signal 114 to handheld unit 104. Signal 114 may include identification information of lighting device 102, or feedback signal in response to control signal 112. In lighting space 100, various objects may be present, such as furniture, decorations, or other objects that may reflect, absorb, and/or scatter light. For example, in FIG. 1, a desk 108 and a chair 110 are located in lighting space 100. There may also be other lighting devices, such as desk lamps, floor lamps, and reading light that are (or are not) subject to the control of handheld unit 104. During a lighting control process, the location of various objects and other lighting devices may affect the desired lighting condition and can be taken into consideration by the lighting control system.

Figure 2:
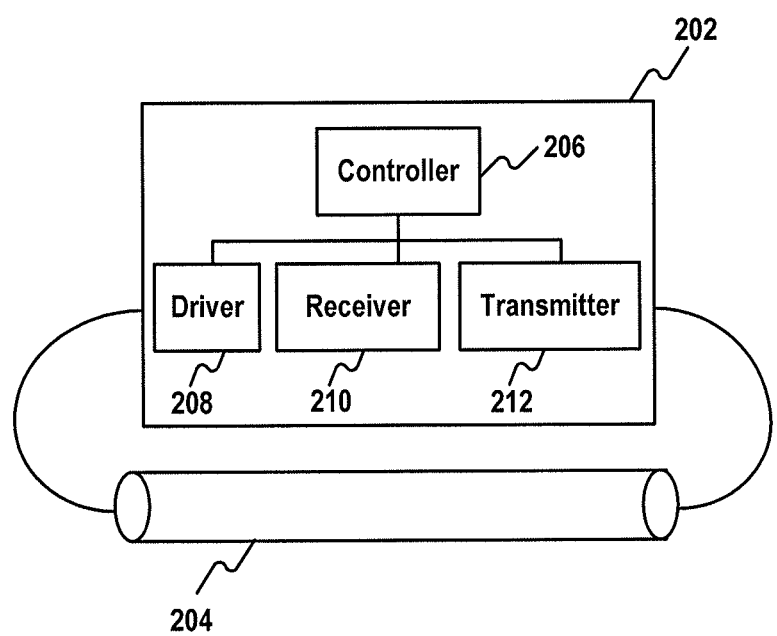
FIG. 2 is a schematic diagram illustrating an exemplary lighting device consistent with some disclosed embodiments.

FIG. 2 shows a schematic diagram of an exemplary lighting device 102. Referring to FIG. 2, lighting device 102 may include a control unit 202 and a dimmable light source 204. Control unit 202 may be an electronic device that is physically attached to or separate from light source 204. In some embodiments, control unit 202 may be integrated with light source 204. Light source 204 may output light in different intensity levels, which may be measured in lumens (i.e., level of luminous flux). Light source 204 may also output light in one or more wavelengths (e.g., colors or color temperatures). For example, light source 204 may include a group of light-emitting diodes ("LEDs"). The group of LEDs may include LEDs of different wavelengths/colors to provide broad spectrum of light, and/or LEDs of same color or similar colors to enhance light intensity and/or uniformity. Lighting device 102 may have one or more controllable aspects, such as a controllable lighting state, a controllable lighting intensity, and a controllable lighting effect, etc.

Control unit 202 may include a driver 208 to drive the dimmable light source 204 of the lighting device 102. For example, driver or driving device 208 may include a driving circuit, which may be in the form of a semiconductor device, such as power switches, regulators, or modulators to provide and control the supplied electrical voltage and current to light source 204 in a controllable manner. Control unit 202 may also include a receiver 210 to receive signal, such as signal 112, from handheld unit 104. Control unit may include a transmitter 212 to send signal, such as signal 114, to handheld unit 104. Receiver 210 and transmitter 212 may be integrated as a transceiver and may include one or more antennas, either shared or separate, to receive/send electromagnetic signal wirelessly. In some embodiments, receiver 210 and transmitter 212 may be integrated into a single transceiver chip, die, or circuit. Receiver 210 and transmitter 212 may be (or be a part of) a "wireless communication interface." Control unit 202 may also include a controller 206 communicatively coupled with driver 208, receiver 210, and transmitter 212, to control the driving, receiving, and sending functions of these components, respectively. For example, controller 206 may control driver 208 to adjust light emitting properties of light source 204, such as light color, output lumens, spectrum, correlated color temperature, and luminance. Controller 206 may also store identification information of the lighting device 102 in a memory (not shown). In addition, controller 206 may process information received by receiver 210 and control transmitter 212 to send information to handheld unit 104. Moreover, controller 206 may control driver 208 to implement desired lighting condition, lighting state, lighting intensity, and/or lighting effect.

Figure 3:
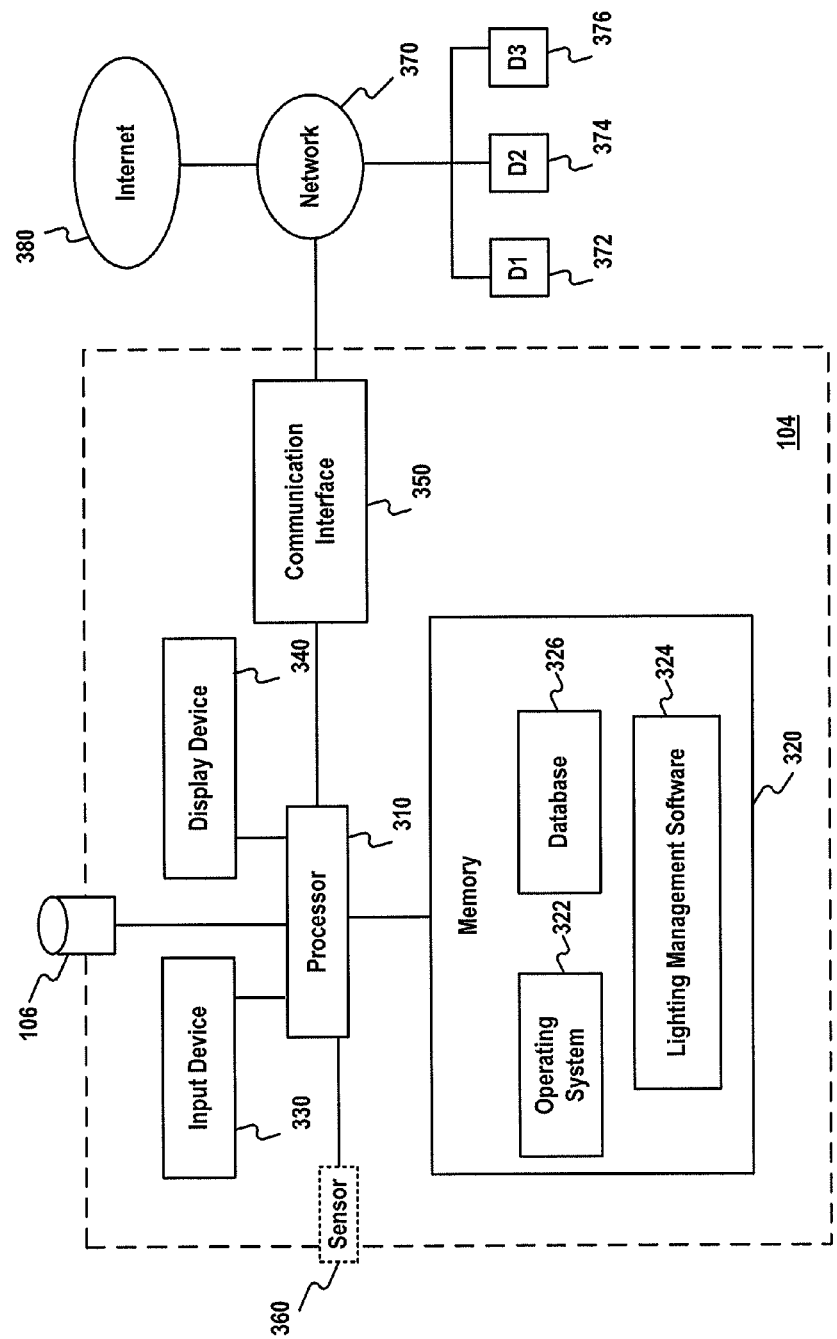
FIG. 3 is a schematic diagram illustrating an exemplary handheld unit consistent with some disclosed embodiments.

FIG. 3 shows an exemplary handheld unit 104 for controlling lighting condition in lighting space 100. Consistent with some embodiments, handheld unit 104 may be a portable computer, mobile phone, PDA, music player, or a computing device dedicated for lighting control. As shown in FIG. 3, handheld unit 104 may include a processor 310, a memory module 320, a user input device 330, a display device 340, a communication interface 350, an image-capturing device or camera 106, and a light sensor 360. Processor 310 can be a central processing unit ("CPU") or a graphic processing unit ("GPU"). Depending on the type of hardware being used, processor 310 can include one or more printed circuit boards, and/or a microprocessor chip. Processor 310 can execute sequences of computer program instructions to perform various methods that will be explained in greater detail below.

Memory module 320 can include, among other things, a random access memory ("RAM") and a read-only memory ("ROM"). The computer program instructions can be accessed and read from the ROM, or any other suitable memory location, and loaded into the RAM for execution by processor 310. For example, memory module 320 may store one or more software applications. Software applications stored in memory module 320 may include operating system 322 for common computer systems, mobile computing systems, as well as for software-controlled devices. Further, memory module may store an entire software application or only a part of a software application that is executable by processor 310.

In some embodiments, memory module 320 may store lighting management software 324 that may be executed by processor 310. For example, lighting management software 324 may be executed to manage lighting condition in lighting space 100 by controlling one or more lighting devices, such as lighting device 102 illustrated in FIG. 1. It is also contemplated that lighting management software 324 or portions of it may be stored on a removable computer readable medium, such as a hard drive, computer disk, CD-ROM, DVD±R, CD±RW or DVD±RW, HD or Blu-ray DVD, USB flash drive, SD card, memory stick, or any other suitable medium, and may run on any suitable component or processor of handheld unit 104. For example, portions of the application to perform lighting management may reside on a removable computer readable medium and be read and acted upon by processor 310 using routines that have been copied to memory 320.

In some embodiments, memory module 320 may also store master data, user data, application data and/or program code. For example, memory module 320 may store a database 326 having therein various lighting control data used for manage/control lighting condition.

Communication interface 350 may provide communication connections or couplings such that handheld unit 104 may exchange data with external devices. For example, handheld unit 104 may be coupled with wireless network 370. Network 370 may be a LAN or WAN that may include other devices, such as D1 (372), D2 (374), and D3 (376). Devices D1, D2, and/or D3 may be identical to handheld unit 104, or may be different devices. In some embodiments, one or more of the devices (D1-D3) may be lighting devices. For example, when the control unit 202 of light device 102 is equipped with wireless network coupling device and capable of joining network 370, lighting device 102 may be recognized or configured as a network node in network 370. In addition, network 370 may be connected to or coupled with Internet 380 to communicate with servers or clients that reside remotely on the Internet. In some embodiments, communication interface 350 may establish direct wireless link with light device 102, without joining network 370.

Handheld unit 104 may include image capturing device or camera 106 to capture an image of lighting space 100. Camera 106 may be controlled by processor 310 and the image data may be stored in memory 320. Handheld unit 104 may also include a light sensor 360 to sense luminance level in lighting space 100. In some embodiments, sensor 360 may be a component that physically senses the light condition, where a light sensing portion may be placed on an outside surface of handheld unit 104. Alternatively, sensor 360 may be an internal computing unit that analyzes luminance level from the image captured by camera 106.

Lighting management software 324 may include instructions to calculate lighting parameters, such as luminance of light space, correlated color temperature of light output from the lighting device(s), light color, and output lumens of lighting device(s), based on the image captured by camera 106 and luminance level sensed by light sensor 360. Such parameters may indicate desired lighting condition in lighting space 100.

In some embodiments, input device 330 and display device 340 may be coupled to processor 310 through appropriate interfacing circuitry. In some embodiments, input device 330 may be a hardware keyboard, a keypad, or a touch screen, through which a user may input information or instructions to handheld unit 104. For example, a user may input preferred lighting parameters through input device 330. Display device 340 may include one or more display screens that display the lighting control interface, result, or any related information to the user. In some embodiments, display device 340 may output a real-time image of lighting space 100. In other embodiments, display device 340 may output captured image of lighting space 100. In addition, lighting parameters may be displayed to a user on display device 340.

Figure 4:
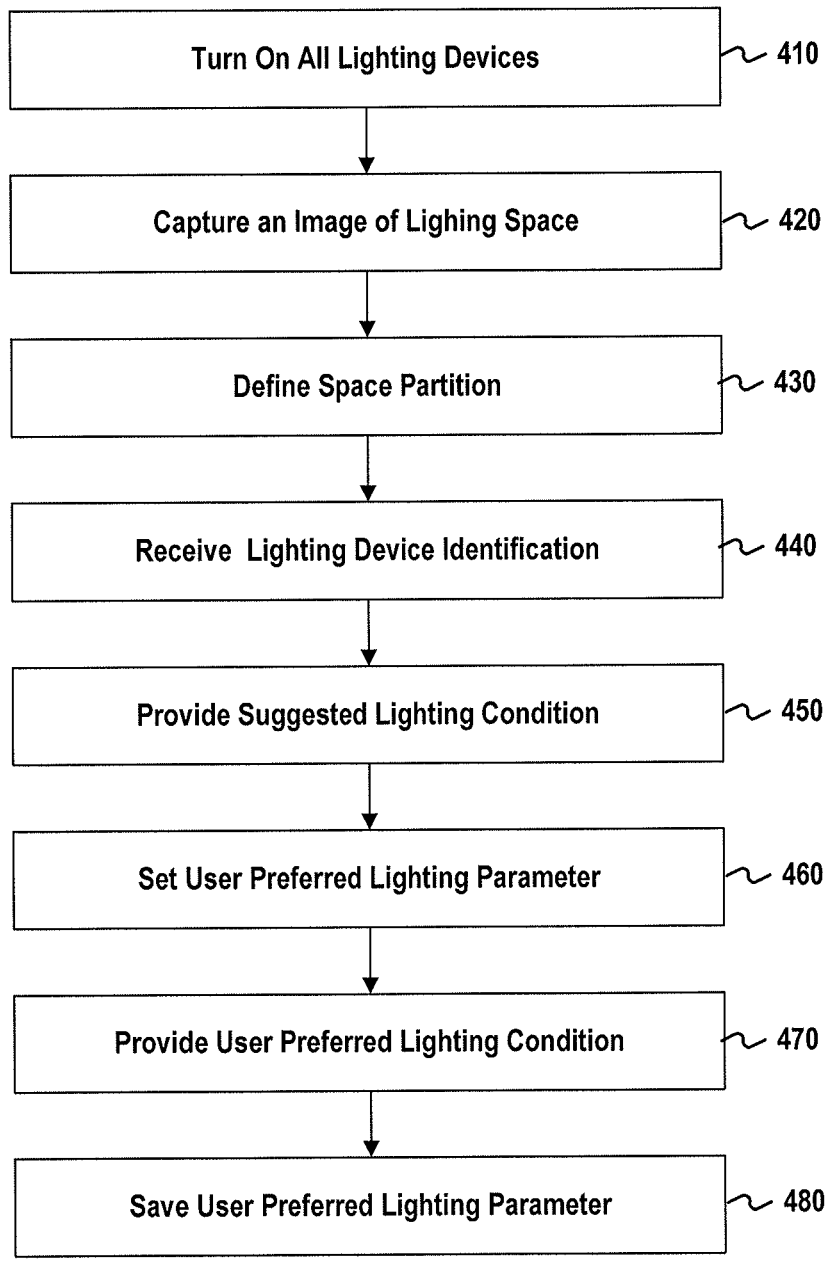
FIG. 4 is a flow chart of an exemplary method for remote lighting control consistent with some disclosed embodiments.

FIG. 4 is a flow chart of an exemplary method for controlling lighting condition, in accordance with some embodiments. As shown in FIG. 4, method 400 may include a series of steps, some of them may be optional. As an example, in step 410, handheld unit 104 may send a command to one or more lighting devices, such as lighting device 102, to turn on some or all devices. In some embodiments, the command may include instructions to turn all lighting devices to their maximum illumination level. In step 420, camera 106 may capture an image of lighting space 100 under current lighting condition (i.e., all lighting devices are on). The image may be displayed on display device 340. In step 430, a user may define partitions of lighting space 100 based on the captured image. For example, the user may identify areas/space having light-affecting objects, such as furniture and decorations, using input device 330. For instance, the user may label table 108 and chair 110 on a touch screen of handheld unit 104 showing the image of lighting space 100. The user may also identify functional areas, such as study area, sitting area, TV watching area, cooking area, resting area, etc. After areas (partitions) of lighting space 100 have been defined, processor 310 may store the information in memory 320.

In step 440, the one or more lighting devices may send identification information to handheld unit 104, which receives the identification information. The identification information may include name, position, orientation, available spectrum, illumination capacity, and other information related to the lighting devices. For example, lighting device 102 may send its identification information through transmitter 212 wirelessly to handheld unit 104.

In step 450, the lighting control system conducts first lighting adjustment based on the captured image, space partition, lighting device identification information, and suggested lighting parameters to provide lighting condition in accordance to a predefined scenario. For example, a group of predefined lighting scenario, such as reading, eating, TV/movie watching, conferencing, sleeping, etc., can be pre-stored in memory 320. A set of lighting parameters may be associated with each lighting scenario. For example, for reading, illuminance may be set to about 500 lux, correlated color temperature may be set to about 5000 K, and light color may be set of white. Therefore, a set of lighting parameters [500 lux, 5000K, white] may be stored in memory 320 and associated with "reading" scenario. In an another example, lighting parameters [300 lux, 4500K, white] may be stored in memory 320 and associated with "conferencing" scenario. Processor 310 may calculate adjusting command based on the captured image, space partition, lighting device identification information, and the suggested lighting parameters and send the adjusting command to lighting device(s) to provide a lighting condition that in accordance with the suggested lighting parameters. Alternatively, adjusting command may be pre-stored in memory 320.

While the suggested lighting parameters, and resulting lighting conditions, may be useful for general purpose, user may not like these preset lighting conditions and may wish to change it to his/her preferred lighting condition. In this case, user may set preferred lighting parameters in step 460. For example, the lighting parameters under current lighting condition (e.g., suggested lighting condition) may be displayed on display device 340. User may set preferred parameters by changing one or more parameters using input device 330, such as a touch screen or a key board. User may adjust individual parameter to his/her preferred value/level. Handheld unit may output a preview showing lighting result using the preferred lighting parameters on display device 340. In addition, the preview may be compared with current lighting condition on display device 340. After the user completes the setting of the preferred lighting parameters, processor 310 calculate adjusting command based on the preferred lighting parameters and send to lighting device(s) to provide user preferred lighting condition in step 470.

In step 480, user preferred lighting parameters may be saved in memory 320 as user preferred mode. Adjusting command corresponding to the user preferred lighting parameters may also be saved under the user preferred mode. After one or more user preferred modes have been saved, user may choose from the preferred modes to set his/her preferred lighting condition and handheld unit 104 may send the saved adjusting commands to lighting device(s) to provide preferred lighting condition.

Figure 5:
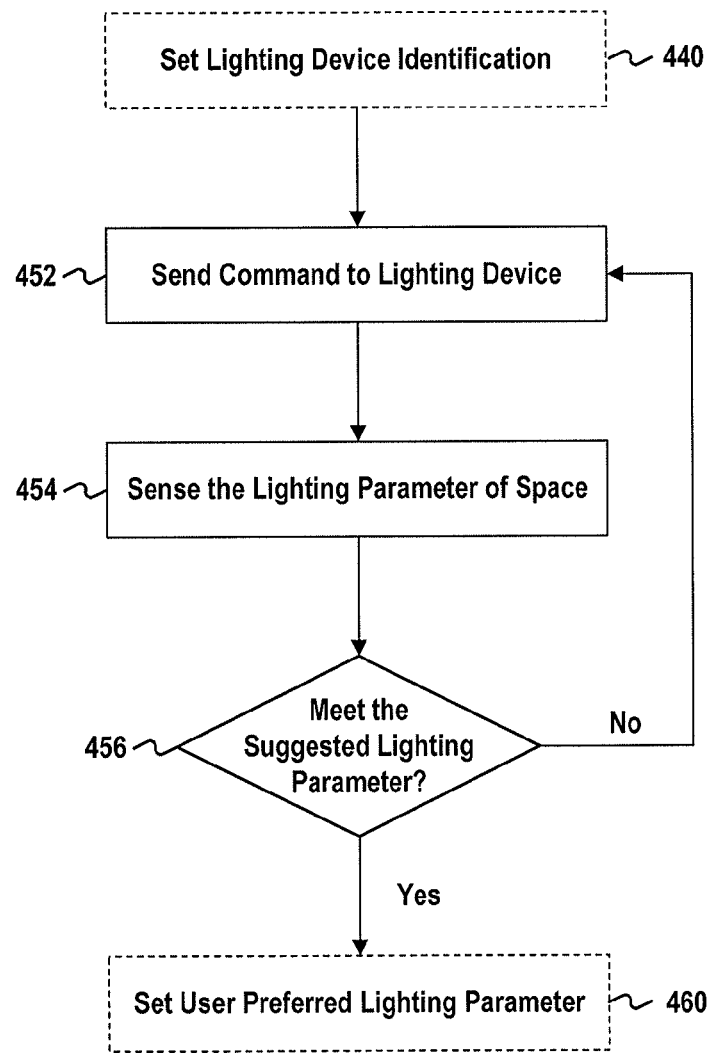
FIG. 5 is a flow chart of an exemplary method for providing suggested lighting condition consistent with some disclosed embodiments.

FIG. 5 is a flow chart of an exemplary method for providing suggested lighting condition, in accordance with some disclosed embodiments. Referring to FIG. 5, step 450 may further include steps 452, 454, and 456. In step 452, processor 310 may send adjusting command corresponding to suggested lighting parameters to lighting device(s) via communication interface 350. In step 454, light sensor 360 may sense the lighting parameter in lighting space 100 after lighting device(s) have been adjusted according to the adjusting command. In step 456, a decision can be made. If the actual lighting parameter sensed by light sensor 360 is different from stored suggested lighting parameter, an adjusting command may be sent to lighting device(s) to further adjust lighting condition, until the actual lighting parameter sensed by light sensor 360 meets the suggested lighting parameters.

Figure 6:
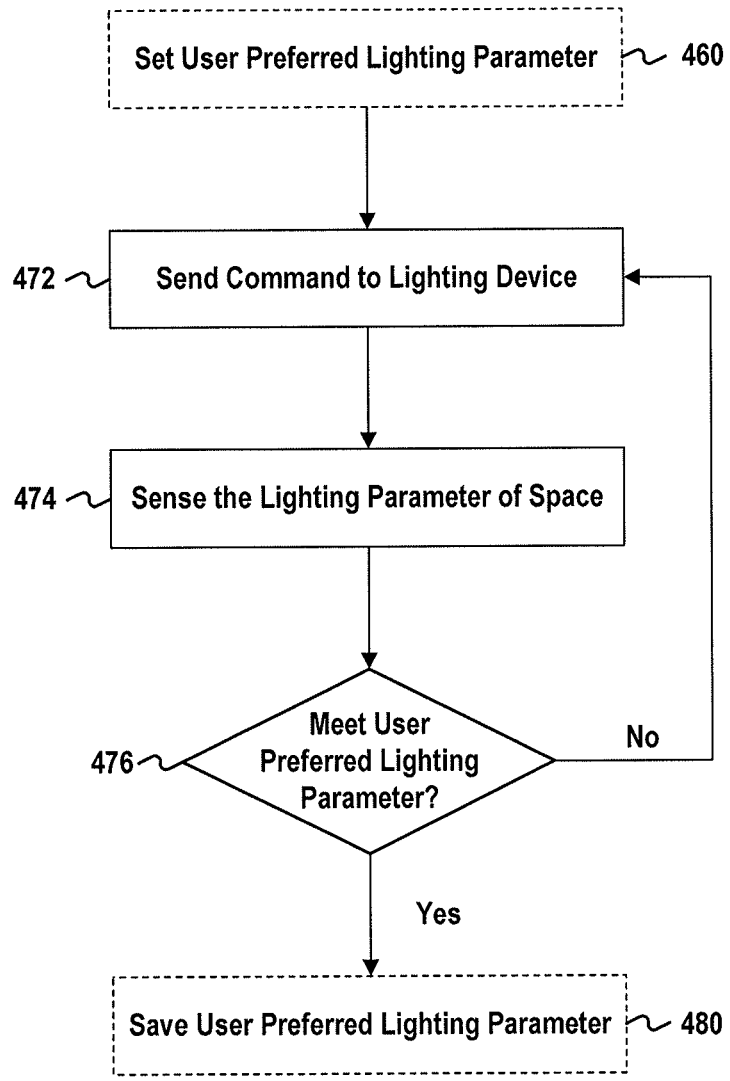
FIG. 6 a flow chart of an exemplary method for providing user preferred lighting condition consistent with some disclosed embodiments.

FIG. 6 is a flow chart of an exemplary method for providing preferred lighting condition, in accordance with some disclosed embodiments. Referring to FIG. 6, step 470 may further include steps 472, 474, and 476. In step 472, processor 310 may send updated adjusting command corresponding to user preferred lighting parameters to lighting device(s) via communication interface 350. In step 474, light sensor 360 may sense the lighting parameter in lighting space 100 after lighting device(s) have been adjusted according to the adjusting command. In step 456, a judgment is made. If the actual lighting parameter sensed by light sensor 360 is different from user preferred lighting parameter, a new adjusting command may be sent to lighting device(s) to further adjust lighting condition, until the actual lighting parameter sensed by light sensor 360 meets the user preferred parameters.

In the foregoing descriptions, various aspects, steps, or components are grouped together in a single embodiment for purposes of illustrations. The disclosure is not to be interpreted as requiring all of the disclosed variations for the claimed subject matter. The following claims are incorporated into this Description of the Exemplary Embodiments, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the disclosure, as claimed. Thus, it is intended that the specification and examples be considered as exemplary only, with a true scope of the present disclosure being indicated by the following claims and their equivalents.

What is claimed is:

1. A lighting control system comprising:
   at least one lighting device providing illumination, the lighting device having at least one of a controllable lighting state, a controllable lighting intensity, and a controllable lighting effect; and
   a handheld unit coupled with the at least one lighting device to control at least one of the controllable lighting state, the controllable lighting intensity, and the controllable lighting effect of the at least one lighting device, the handheld unit comprising:
      an image-capturing device to capture an image of a space affected by the at least one lighting device;
      a processor coupled with the image-capturing device, the processor being configured to:
         control the image-capturing device to capture the image of the space;
         analyze a luminance level of the space;
         receive at least one lighting parameter;
         receive partition information identifying one or more functional areas of the space; and
         provide a command to the at least one lighting device for controlling at least one of the controllable lighting state, the controllable lighting intensity, and the controllable lighting effect of the at least one lighting device based on the partition information and at least one of the image, the luminance level, and the at least one lighting parameter.

2. The system of claim 1, wherein the at least one lighting device comprises:
   a dimmable light source;
   a driving circuit coupled with the dimmable light source to drive the dimmable light source;
   a wireless communication interface; and
   a controller coupled with the wireless communication interface and the driving circuit, the controller being configured to:
      receive the command from the handheld unit via the wireless communication interface; and
      control the driving circuit to adjust light-emitting properties of the dimmable light source based on the command to change at least one of the controllable lighting state, the controllable lighting intensity, and the controllable lighting effect.

3. The system of claim 2, wherein the controller is further configured to send identification information of the dimmable light source to the handheld unit via the wireless communication interface.

4. The system of claim 1, wherein the at least one lighting device includes a light-emitting-diode-based lighting device.

5. The system of claim 1, wherein the at least one lighting parameter includes a suggested lighting parameter stored in a memory of the handheld unit, and the processor is further configured to provide the command based on at least one of the image, the luminance level, and the suggested lighting parameter.

6. The system of claim 1, wherein the processor is further configured to:
   allow a user to set at least one preferred lighting parameter; and
   provide the command based on at least one of the image, the luminance level, and the at least one preferred lighting parameter.

7. The system of claim 6, wherein the processor is further configured to save the at least one preferred lighting parameter in a memory of the handheld unit.

8. The system of claim 1, wherein the processor is further configured to:
   receive identification information from the at least one lighting device; and
   provide the command based on the partition information and at least one of the image, the luminance level, the identification information, and the at least one lighting parameter.

9. The system of claim 1, wherein the at least one lighting parameter includes at least one of illuminance, correlated color temperature, and light color.

10. The system of claim 1, wherein the processor is configured to provide the command to the at least one lighting device via wireless communication.

11. A handheld apparatus for lighting control, wherein the handheld apparatus is coupled with at least one lighting device to control at least one of controllable lighting state, controllable lighting intensity, and controllable lighting effect of the at least one lighting device, the handheld unit comprising:
   an image-capturing device to capture an image of a space affected by the at least one lighting device;
   a processor coupled with the image-capturing device, the processor being configured to:
      control the image-capturing device to capture the image of the space;
      analyze a luminance level of the space;
      receive at least one lighting parameter;
      receive partition information identifying one or more functional areas of the space; and
      provide a command to the at least one lighting device for controlling at least one of the controllable lighting state, the controllable lighting intensity, and the controllable lighting effect of the at least one lighting device based on the partition information and at least one of the image, the luminance level, and the at least one lighting parameter.

12. The handheld apparatus of claim 11, wherein the at least one lighting parameter includes a suggested lighting parameter stored in a memory of the handheld apparatus, and the processor is further configured to provide the command based on at least one of the image, the luminance level, and the suggested lighting parameter.

13. The handheld apparatus of claim 11, wherein the processor is further configured to:
   allow a user to set at least one preferred lighting parameter; and
   provide the command based on at least one of the image, the luminance level, and the at least one preferred lighting parameter.

14. The handheld apparatus of claim 13, wherein the processor is further configured to save the at least one preferred lighting parameter in a memory of the handheld apparatus.

15. The handheld apparatus of claim 11, wherein the processor is further configured to:
   receive identification information from the at least one lighting device; and
   provide the command based on the partition information and at least one of the image, the luminance level, the identification information, and the at least one lighting parameter.

16. The handheld apparatus of claim 11, wherein the at least one lighting parameter includes at least one of illuminance, correlated color temperature, and light color.

17. The handheld apparatus of claim 11, further comprising a wireless communication interface coupled with the processor, wherein the processor is configured to provide the command to the at least one lighting device via the wireless communication interface.

18. A method for lighting control, comprising:
   controlling, by a processor of a handheld unit, an image-capturing device to capture an image of a space affected by at least one lighting device;
   analyzing a luminance level of the space;
   receiving at least one lighting parameter;
   receiving partition information identifying one or more functional areas of the space; and
   providing a command to the at least one lighting device for controlling at least one of controllable lighting state, controllable lighting intensity, and controllable lighting effect of the at least one lighting device based on the partition information and at least one of the image, the luminance level, and the at least one lighting parameter.

19. The method of claim 18, wherein the at least one lighting parameter includes a suggested lighting parameter stored in a memory of the handheld unit, and the method further comprising providing the command based on at least one of the image, the luminance level, and the suggested lighting parameter.

20. The method of claim 18, further comprising:
   allowing a user to set at least one preferred lighting parameter; and
   providing the command based on at least one of the image, the luminance level, and the at least one preferred lighting parameter.

21. The method of claim 20, further comprising saving the at least one preferred lighting parameter in a memory of the handheld unit.

22. The method of claim 18, further comprising:
   receiving identification information from the at least one lighting device; and
   providing the command based on the partition information and at least one of the image, the luminance level, the identification information, and the at least one lighting parameter.

23. The method of claim 18, wherein the at least one lighting parameter includes at least one of illuminance, correlated color temperature, and light color.

24. The method of claim 18, wherein providing the command to the at least one lighting device is via wireless communication.

25. A non-transitory computer-readable medium encoded with software code instructions, when executed by a computer, implementing a method for lighting control, the method comprising:
   controlling an image-capturing device of a handheld unit to capture an image of a space affected by at least one lighting device;
   analyzing a luminance level of the space;
   receiving at least one lighting parameter;
   receiving partition information identifying one or more functional areas of the space; and
   providing a command to the at least one lighting device for controlling at least one of controllable lighting state, controllable lighting intensity, and controllable lighting effect of the at least one lighting device based on the partition information and at least one of the image, the luminance level, and the at least one lighting parameter.

26. The non-transitory computer-readable medium of claim 25, wherein the at least one lighting parameter includes a suggested lighting parameter stored in a memory of the handheld unit, and the method further comprising providing the command based on at least one of the image, the luminance level, and the suggested lighting parameter.

27. The non-transitory computer-readable medium of claim 25, the method further comprising:
   allowing a user to set at least one preferred lighting parameter; and
   providing the command and based on at least one of the image, the luminance level, and the at least one preferred lighting parameter.

28. The non-transitory computer-readable medium of claim 27, the method further comprising saving the at least one preferred lighting parameter in a memory of the handheld unit.

29. The non-transitory computer-readable medium of claim 25, the method further comprising:
receiving identification information from the at least one lighting device; and
providing the command based on the partition information and at least one of the image, the luminance level, the identification information, and the at least one lighting parameter.

30. The non-transitory computer-readable medium of claim 25, wherein the at least one lighting parameter includes at least one of illuminance, correlated color temperature, and light color.

31. The non-transitory computer readable medium of claim 25, wherein providing the command to the at least one lighting device is via wireless communication.

* * * * *